US011261849B2

(12) United States Patent
Gao et al.

(10) Patent No.: US 11,261,849 B2
(45) Date of Patent: Mar. 1, 2022

(54) COOLING SYSTEM FOR SHAFTING AND CONTROL METHOD THEREOF, AND WIND TURBINE

(71) Applicant: BEIJING GOLDWIND SCIENCE & CREATION WINDPOWER EQUIPMENT CO., LTD., Beijing (CN)

(72) Inventors: Yang Gao, Beijing (CN); Luolin Bai, Beijing (CN); Ran Yin, Beijing (CN); Tao Fang, Beijing (CN); Kunfeng Liang, Henan (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 216 days.

(21) Appl. No.: 16/329,490

(22) PCT Filed: Jun. 1, 2018

(86) PCT No.: PCT/CN2018/089529
§ 371 (c)(1),
(2) Date: Feb. 28, 2019

(87) PCT Pub. No.: WO2019/109612
PCT Pub. Date: Jun. 13, 2019

(65) Prior Publication Data
US 2019/0285059 A1    Sep. 19, 2019

(30) Foreign Application Priority Data

Dec. 6, 2017  (CN) .......................... 201711278833.4

(51) Int. Cl.
*F03D 80/60* (2016.01)
*F03D 80/70* (2016.01)

(52) U.S. Cl.
CPC ............. *F03D 80/60* (2016.05); *F03D 80/70* (2016.05); *F05B 2260/208* (2013.01);
(Continued)

(58) Field of Classification Search
CPC .............................. F03D 80/60; F16C 37/007
See application file for complete search history.

(56) References Cited

U.S. PATENT DOCUMENTS 8,492,919 B2 * 7/2013 Pabst ................... H02K 7/1838
290/44
9,209,665 B2 * 12/2015 Casazza ............... H02K 1/2773
(Continued)

FOREIGN PATENT DOCUMENTS

CN    102713273 A    10/2012
CN    103299095 A     9/2013
(Continued)

OTHER PUBLICATIONS

Extended European Search Report dated Oct. 23, 2019; Appln. No. 18811124.9.

(Continued)

*Primary Examiner* — Justin D Seabe

(57) ABSTRACT

A cooling system for a shafting and a control method therefor, and a wind turbine are provided. The cooling system includes a cold air supply unit and a rotating-shaft air blow box. The rotating-shaft air blow box is mounted on an inner surface of the stationary shaft and in the shape of a circular ring-shaped box, multiple first air blow openings are uniformly distributed in a surface, facing the rotating shaft, of the rotating-shaft air blow box in a circumferential direction, to blow cold air from the cold air supply unit to the rotating shaft. Each first air blow opening is in the shape of a slit to form a jet.

20 Claims, 5 Drawing Sheets

(52) U.S. Cl.
CPC ..... *F05B 2260/232* (2013.01); *F05B 2260/64* (2013.01); *Y02E 10/72* (2013.01)

(56) References Cited

U.S. PATENT DOCUMENTS

| | | | |
|---|---|---|---|
| 9,303,694 B2* | 4/2016 | Eriksen | F16C 37/00 |
| 9,624,908 B2* | 4/2017 | Airoldi | F03D 15/20 |
| 10,819,170 B2* | 10/2020 | Messner | F03D 9/25 |
| 2012/0133152 A1* | 5/2012 | Wagoner | F03D 80/60 290/1 B |
| 2012/0280511 A1 | 11/2012 | Eriksen | |
| 2013/0287328 A1 | 10/2013 | Frank | |
| 2014/0321781 A1 | 10/2014 | Pedersen et al. | |
| 2014/0346781 A1 | 11/2014 | Airoldi et al. | |
| 2015/0023621 A1 | 1/2015 | Eriksen et al. | |
| 2015/0211572 A1* | 7/2015 | Casazza | F16C 25/08 290/44 |

FOREIGN PATENT DOCUMENTS

| | | |
|---|---|---|
| CN | 203272484 U | 11/2013 |
| CN | 104121287 A | 10/2014 |
| CN | 104295454 A | 1/2015 |
| CN | 205207057 U | 5/2016 |
| CN | 205714607 U | 11/2016 |
| CN | 107044390 A | 8/2017 |
| CN | 108019324 A | 5/2018 |
| EP | 2827012 A1 | 1/2015 |
| EP | 3236065 A1 | 10/2017 |
| JP | 2008-157340 A | 7/2008 |
| WO | 2011/082836 A1 | 7/2011 |
| WO | 2013/152850 A1 | 10/2013 |

OTHER PUBLICATIONS

First Australian Examination Report dated Sep. 11, 2019; Appln. No. 2018282297.
The First Chinese Office Action dated Feb. 28, 2019; Appln. No. 201711278833.4.
International Search Report and Written Opinion dated Aug. 30, 2018; PCT/CN2018/089529.

* cited by examiner

COOLING SYSTEM FOR SHAFTING AND CONTROL METHOD THEREOF, AND WIND TURBINE

CROSS-REFERENCE TO RELATED APPLICATIONS

This application is the national phase of International Application No. PCT/CN2018/089529, titled "COOLING SYSTEM FOR SHAFTING AND CONTROL METHOD THEREOF, AND WIND TURBINE", filed on Jun. 1, 2018, which claims the benefit of priority to Chinese patent application No. 201711278833.4 titled "COOLING SYSTEM FOR SHAFTING AND CONTROL METHOD THEREOF, AND WIND TURBINE", filed with the Chinese State Intellectual Property Office on Dec. 6, 2017, entire disclosures of both applications are incorporated herein by reference.

FIELD

The present application relates to the field of wind power generation, and particularly relates to a cooling system for a shafting of a wind turbine, a wind turbine including the cooling system and a control method of the cooling system.

BACKGROUND

Wind turbines mostly employ permanent-magnet direct-drive wind power generators. As shown in FIG. 1 (a schematic view showing the structure of a wind turbine), the wind turbine with a permanent-magnet direct-drive wind power generator mainly includes: blades 1, a hub 2, a generator subsystem 3, a nacelle 4 and a tower 5. As shown in FIG. 2 (a cross-sectional view of a portion A of FIG. 1), the generator subsystem 3 mainly includes: a permanent-magnet direct-drive wind power generator 6, a stationary shaft 7, a rotating shaft 9, and a main bearing. The main bearing includes an inner ring 10, rollers 8 and an outer ring 11, the inner ring 10 is connected to the rotating shaft 9, and the outer ring 11 is connected to the stationary shaft 7. Since the blades 1 and the hub 2 are connected to the rotating shaft 9, the relative movement between the rotating shaft 9 and the stationary shaft 7 can be achieved by the rollers 8 of the main bearing under the action of external wind loads. Therefore, the main bearing is one of the core components of the wind turbine, and the service life of the main bearing affects the service life of the entire wind turbine. Once the main bearing fails, the replacement of the main bearing is very difficult and expensive.

In order to ensure the normal operation of the main bearing, the main bearing needs to be lubricated. At present, there are two main lubrication methods for the main bearing: grease lubrication and oil lubrication. For rolling bearings, grease lubrication is generally used because compared to the oil lubrication, the grease lubrication device is simpler and the grease is less likely to leak, which is convenient for the maintenance of the main bearing.

However, the wind turbine may be installed in coastal areas, Gobi and grassland areas, and the climatic conditions vary greatly between these areas. If the heat generated in the main bearing cannot be effectively dissipated, and additionally the wind turbine is located in a harsh environment (such as a high temperature environment), the main bearing may operate under a high temperature continuously, and the service life of the grease will decrease rapidly as the temperature increases, thereby causing failure of the lubricating function of the grease.

Since the rollers 8, the inner ring 10 and the outer ring 11 are subjected to the external wind loads and bear the weight of the wind turbine itself, a large friction torque is produced when the inner ring 10 and the outer ring 11 rotate relative to each other, and thus large amounts of heat is generated inside the main bearing. If the generated heat cannot be dissipated in real time, the main bearing will have a high temperature, and the high temperature will cause the viscosity of the grease to decrease, further affecting the formation of the lubricating oil film between the inner ring 10, the rollers 8 and the outer ring 11 of the main bearing. As a result, dry friction may occur, causing the temperature of the components inside the transmission system to rise sharply, and the working clearance of the main bearing may exceed a reasonable working range due to the thermal expansion, and even a "shaft seizure" phenomenon may occur. It can be seen that long-term high-temperature operation will lead to severe vicious cycle, and seriously affect the service life of the main bearing, resulting in failure of the main bearing, which is unable to meet the requirement of allowing the wind turbine to have an operation life of 20 to 25 years.

In fact, not only the main bearing but also the bearings in other shafting have the above problems. Most failure modes of the bearings are ultimately caused by "heat". Moreover, as the power of the wind turbine increases gradually, the heat dissipation problem not only affects the service life of the grease, but also poses a threat (for example, internal components may melt due to high temperatures) to other components of the wind turbine, which attracts more and more attentions.

SUMMARY

An object of the present application is to provide a cooling system for a shafting of a wind turbine so as to effectively dissipate the heat of the shafting.

A cooling system for a shafting of a wind turbine is provided according to an aspect of the present application. The shafting includes a stationary shaft, a rotating shaft, and a bearing provided between the stationary shaft and the rotating shaft, the bearing includes an outer ring, rollers and an inner ring, the outer ring is connected to the stationary shaft, and the inner ring is connected to the rotating shaft. The cooling system includes: a cold air supply unit; and a rotating-shaft air blow box, the rotating-shaft air blow box is mounted on an inner surface of the stationary shaft and in a shape of a circular ring-shaped box, multiple first air blow openings are uniformly distributed in a surface, facing the rotating shaft, of the rotating-shaft air blow box in a circumferential direction, to blow cold air from the cold air supply unit to the rotating shaft, and each of the multiple first air blow openings is in a shape of a slit to form a jet, thereby enhancing heat exchange and improving the cooling effect of the rotating shaft.

The cooling system further includes a stationary-shaft air blow box, the stationary-shaft air blow box is mounted on the inner surface of the stationary shaft and is in a shape of a circular ring-shaped box, multiple second air blow openings are uniformly distributed in a surface, facing the shafting, of the stationary-shaft air blow box in a circumferential direction, to blow the cold air from the cold air supply unit to the outer ring, and each of the multiple second air blow openings is in a shape of a slit to form a jet, thereby enhancing heat exchange and improving the cooling effect of the rotating shaft.

The cooling system further includes an annular heat dissipation assembly fixedly mounted on an inner surface of the rotating shaft, in order to better dissipate the heat from the shafting.

The annular heat dissipation assembly includes multiple heat dissipation units, and each of the multiple heat dissipation units includes a base plate and a heat pipe embedded in the base plate, in order to facilitate the installation of the annular heat dissipation assembly.

The heat pipe includes a first extension portion extending inward along a radial direction of the rotating shaft from the base plate, a second extension portion extending along an axial direction of the rotating shaft from an end of the first extension portion, and a third extension portion extending inward along the radial direction of the rotating shaft from an end of the second extension portion, and each of the plurality of the heat dissipation units further includes heat dissipation fins interposed in the third extension portion, in order to more effectively dissipate heat.

The heat pipe includes a single pipe formed by bending or multiple pipes arranged in parallel with each other.

The annular heat dissipation assembly is mounted on the inner surface of the rotating shaft by a pressing strip, the pressing strip is formed by splicing multiple arc segments together, and is configured to support inner surfaces of the multiple base plates to fixedly mount the annular heat dissipation assembly on the inner surface of the rotating shaft, in order to securely mount the annular heat dissipation assembly in a simple manner.

The cold air supply unit includes: a condenser and an air treatment tank. The condenser is mounted on a nacelle of the wind turbine. The air treatment tank includes: an evaporator forming a circulation loop with the condenser through a cooling medium pipe; and an air inlet for introducing external air.

The air treatment tank further includes: a first air blow opening in communication with the rotating-shaft air blow box, and a second air blow opening in communication with the stationary-shaft air blow box; and fans are respectively provided in the vicinity of the first air blow opening and the second air blow opening, thus the flow rate and flow amount of the blown cold air can be adjusted by adjusting the speed of the fans.

The cooling system further includes an annular fixing bracket for fixing the rotating-shaft air blow box, the stationary-shaft air blow box and the air treatment tank, thereby effectively utilizing an internal space of the shafting.

A wind turbine is provided according to another aspect of the present application, where the wind turbine includes the above cooling system.

A control method for the cooling system is provided according to yet another aspect of the present application, including: determining whether a temperature of the shafting is higher than a preset temperature threshold in a case that the wind turbine is in operation; operating the cooling system in a first operation mode if the temperature of the shafting is lower than the preset temperature threshold; and operating the cooling system in a second operation mode if the temperature of the shafting is higher than the preset temperature threshold; and wherein the cold air supply unit supplies natural wind in the first operation mode and supplies cold air in the second operation mode, thereby reducing energy consumption and improving energy efficiency.

The method includes: calculating a temperature difference between the inner ring and the outer ring in the first operation mode; supplying a first preset air amount to the outer ring and a second preset air amount to the rotating shaft in a case that an absolute value of the temperature difference is smaller than a first preset temperature value; and adjusting an air supply amount of the cold air supply unit in a case that the absolute value of the temperature difference is greater than or equal to the first preset temperature value, to increase an air amount supplied to one having a higher temperature between the inner ring and the outer ring and reduce an air amount supplied to the other one having a lower temperature between the inner ring and the outer ring.

The method includes: calculating the absolute value of the temperature difference between the inner ring and the outer ring in the second operation mode;

determining whether at least one of the inner ring and the outer ring has a temperature higher than or equal to a second preset temperature value in a case that the absolute value is smaller than the first preset temperature value; increasing air supply amounts for the stationary shaft and the rotating shaft at the same time if at least one of the inner ring and the outer ring has a temperature higher than or equal to the second preset temperature value; and maintaining the first preset air amount and the second preset air amount unchanged if neither one of the inner ring and the outer ring has a temperature higher than or equal to the second preset temperature value;

determining whether a temperature of the inner ring is higher than a temperature of the outer ring in a case that the absolute value is greater than or equal to the first preset temperature value;

determining whether the temperature of the outer ring is higher than or equal to the second preset temperature value if the temperature of the inner ring is higher than the temperature of the outer ring; increasing the air supply amounts for the stationary shaft and the rotating shaft at the same time if the temperature of the outer ring is higher than or equal to the second preset temperature value; and increasing the air supply amount for the rotating shaft and reducing the air supply amount for the stationary shaft if the temperature of the outer ring is lower than the second preset temperature value; and determining whether the temperature of the inner ring is higher than or equal to the second preset temperature value if the temperature of the inner ring is lower than or equal to the temperature of the outer ring; increasing the air supply amounts for the stationary shaft and the rotating shaft at the same time if the temperature of the inner ring is higher than or equal to the second preset temperature value; and increasing the air supply amount for the stationary shaft and reducing the air supply amount for the rotating shaft if the temperature of the inner ring is lower than the second preset temperature value.

The preset temperature threshold is embodied as 35° C., the first preset temperature value (a) is embodied as 5° C., and the second preset temperature value (b) is embodied as 60° C.

The cooling system according to the present application is added after the design of the wind turbine is completed according to the spatial layout of the wind turbine, thereby achieving reliable installation and operation of the cooling system without affecting the operation of other components in the wind turbine.

The cooling system according to the present application can effectively and specifically dissipate heat from the shafting through the combination of the cooling system and the annular heat dissipation assembly, thereby ensuring that the temperature of the shafting in the wind turbine is within a reasonable working range.

The cooling system according to the present application has air blow boxes respectively corresponding to the inner ring and the outer ring, so that the inner and outer rings can be synchronously cooled to guarantee the temperature difference between the inner and outer rings, thereby ensuring the working clearance of the bearing.

The air blow openings of the air blow box according to the present application can form a jet, thereby enhancing heat exchange to obtain a better cooling effect.

According to the control method for the cooling system in the present application, specific temperature difference control logic is proposed for heat generation inside the main bearing caused by different external environmental temperatures and the operation characteristics of the wind turbine itself, thereby guaranteeing the clearance of the main bearing and ensuring the operation safety.

REFERENCE NUMERALS

| 1 | blade, | 2 | hub, |
|---|---|---|---|
| 3 | generator subsystem, | 4 | nacelle, |
| 5 | tower, | | |
| 6 | permanent-magnet direct-drive wind power generator, | | |
| 7 | stationary shaft, | 8 | roller, |
| 9 | rotating shaft, | 10 | inner ring, |
| 11 | outer ring, | 12 | condenser, |
| 13 | cooling medium pipe, | 14 | air treatment tank, |
| 14a | air inlet, | 15 | annular heat dissipation assembly, |
| 16 | stationary-shaft air blow box, | 16a | second air blow opening, |
| 17 | annular fixing bracket, | 18 | pressing strip, |
| 19 | rotating-shaft air blow box, | 19a | first air blow opening, |
| 20 | heat pipe, | 21 | heat dissipation fin, |
| 22 | base plate, | 23 | evaporator, |
| 24 | stationary-shaft air blow assembly, | 25 | rotating-shaft air blow assembly. |

DETAILED DESCRIPTION

The embodiments of the present application will be specifically described below in conjunction with the accompanying drawings.

Hereinafter, a main bearing of a wind turbine will be described as a cooling object, but it should be noted that the present application is not limited to this, and the cooling system according to the exemplary embodiments may also be applied to other shafting of the wind turbine. In addition, the description about the directions is based on the shape of the main bearing, for example, descriptions such as "inside", "outside", "inner surface" and "inner surface" are based on a radial direction of the main bearing, specifically, the side that is close to the central axis of the main bearing and faces the central axis is "inside" or "inner surface", and the opposite side is "outside" or "outer surface".

Figure 1:
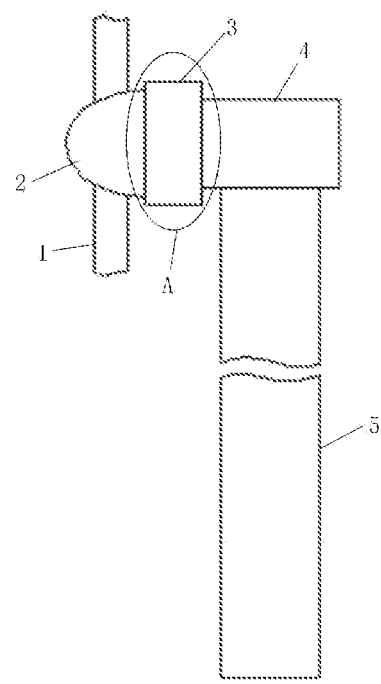
FIG. 1 is a schematic view showing the structure of a wind turbine.
Figure 2:
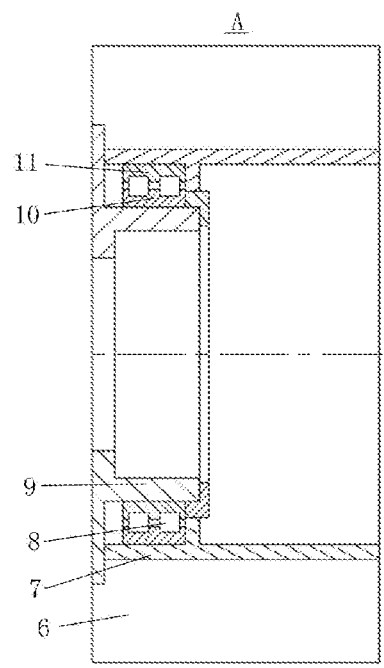
FIG. 2 is a cross-sectional view of a portion A of FIG. 1.
Figure 3:
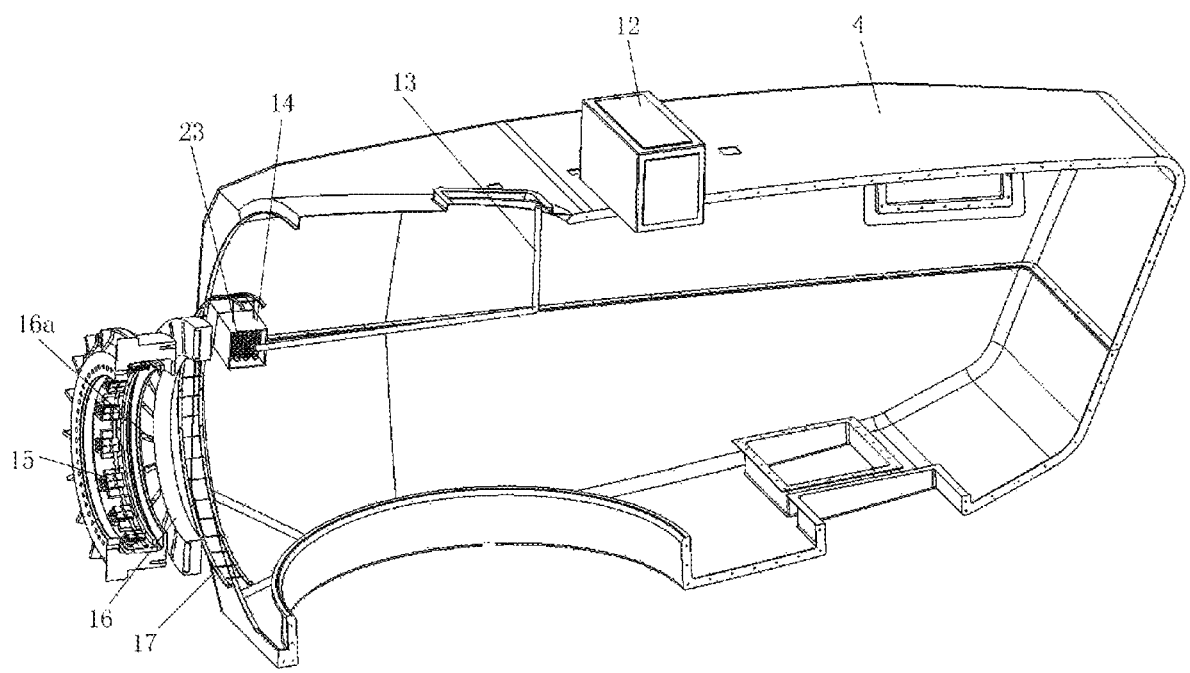
FIG. 3 is a partially sectional view showing the breakdown structure of a wind turbine including a cooling system according to an embodiment of the present application.
Figure 4:
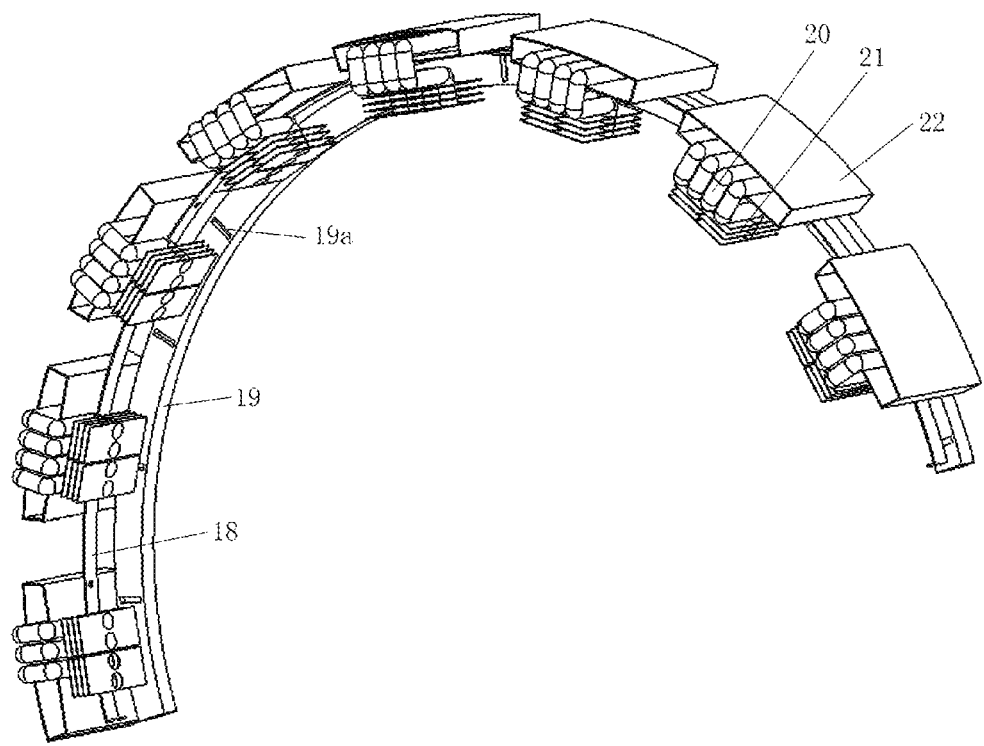
FIG. 4 is a partially schematic view showing the structure of a cooling system according to an embodiment of the present application.
Figure 5:
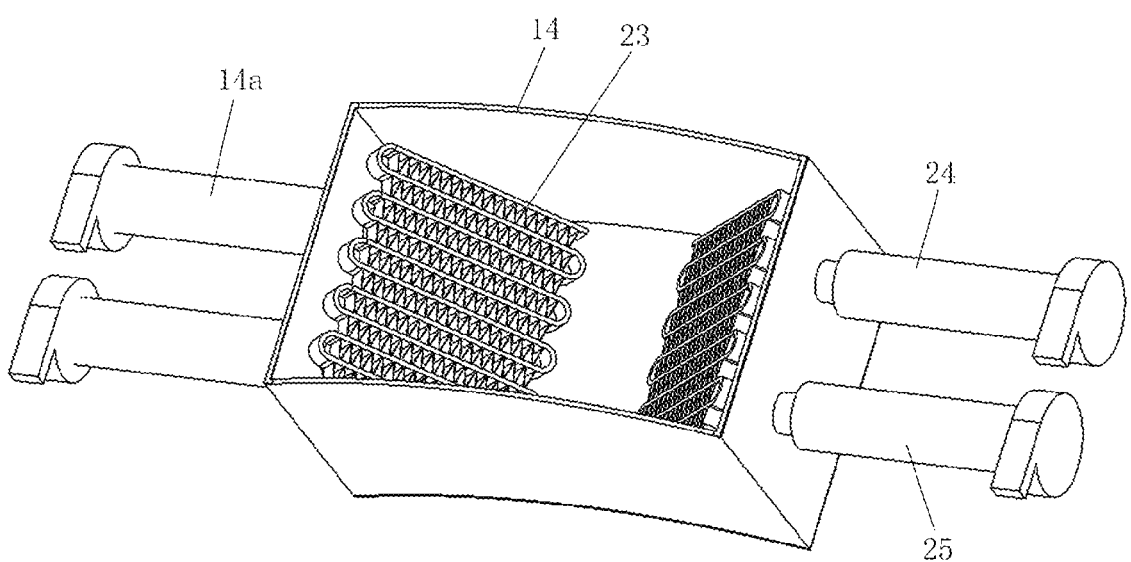
FIG. 5 is a schematic view showing the internal structure of an air treatment tank according to an embodiment of the present application.

FIG. 3 is a partially sectional view showing the breakdown structure of a wind turbine including a cooling system according to an embodiment of the present application; FIG. 4 is a partially schematic view showing the structure of a cooling system according to an embodiment of the present application; FIG. 5 is a schematic view showing the internal structure of an air treatment tank according to an embodiment of the present application.

As shown in FIGS. 3 to 5, a cooling system according to an embodiment of the present application includes: a cold air supply unit; and a rotating-shaft air blow box 19. The rotating-shaft air blow box 19 is mounted on an inner surface of a stationary shaft 7 and is in the shape of a circular ring-shaped box, multiple first air blow openings 19a are uniformly distributed in a surface, facing a rotating shaft 9, of the rotating-shaft air blow box 19 in a circumferential direction, to blow cold air from the cold air supply unit to the rotating shaft 9. Each of the multiple first air blow openings 19a is in the shape of a slit, to form a jet. The reason why the jet is formed is that: when the fluid flows from a relatively large space (the rotating-shaft air blow box 19) to a small space (the slit-shaped first air blow openings 19a), the air flow speed is increased, and the air flow pressure is increased, so that the air is ejected from the large space at a high speed and the heat transfer coefficient of forced convection is increased to more effectively cool the rotating shaft 9, and thus in turn cooling an inner ring 10.

Moreover, the cooling system further includes a stationary-shaft air blow box 16. The stationary-shaft air blow box 16 may also be mounted on the inner surface of the stationary shaft 7 and is in the shape of a circular ring-shaped box. Similar to the rotating-shaft air blow box 19, multiple second air blow openings 16a are uniformly distributed in a surface, facing the main bearing, of the stationary-shaft air blow box 16 in a circumferential direction, to blow cold air from the cold air supply unit to an outer ring 11. Each of the multiple second air blow openings 16a is in the shape of a slit to form a jet.

It should be noted that the air blown to the outer ring 11 and the rotating shaft 9 as referred to herein does not mean that the air is blown onto the outer ring 11 and the rotating shaft 9 very accurately, but means that the air may be blown to places adjacent to the outer ring 11, or blown onto the components (for example, rollers 8) adjacent to the bearing ring 11, or blown to the vicinity of the rotating shaft 9.

By making the cold air flow out of the stationary-shaft air blow box 16 and the rotating-shaft air blow box 19 in a form of a jet, the heat exchange is enhanced and the cooling effect is improved.

However, the structure of the air blow box is not limited to this. The stationary-shaft air blow box 16 and the rotating-shaft air blow box 19 may also be formed as an integral structure, that is, the stationary-shaft air blow box 16 and the rotating-shaft air blow box 19 may be integrally formed into a circular ring-shaped box, and the box is divided by a partition plate into two air passages respectively facing different areas, so that cold air can be respectively blown to the vicinity of the outer ring 11 and the vicinity of the rotating shaft 9 in the form of a jet.

In addition, although a situation that the stationary-shaft air blow box 16 and the rotating-shaft air blow box 19 are both mounted on the inner surface of the stationary shaft 7 are described above, it is also practicable that the rotating-shaft air blow box 19 may be mounted on an inner surface of the stationary-shaft air blow box 16, to be indirectly mounted on the inner surface of the stationary shaft 7 through the stationary-shaft air blow box 16, so that the inner space of the main bearing can be utilized more effectively.

Since heat generated by the friction between the rollers 8 and the inner ring 10 and the friction between the rollers 8 and the outer ring 11 is transmitted to the inner ring 10 in a radial direction, and further is transmitted to the rotating shaft 9, in order to realize better heat dissipation, an annular heat dissipation assembly 15 may be mounted on an inner surface of the rotating shaft 9.

As shown in FIG. 4, the cooling system may further include the annular heat dissipation assembly 15. In order to facilitate the installation of the annular heat dissipation assembly 15, the annular heat dissipation assembly 15 may include multiple heat dissipation units, and each of the multiple heat dissipation units includes a base plate 22 and a heat pipe 20 embedded in the base plate 20. The heat pipe 20 includes a first extension portion extending inward along a radial direction of the rotating shaft 9 from the base plate 22, a second extension portion extending along an axial direction of the rotating shaft 9 from an end of the first extension portion, and a third extension portion extending inward along the radial direction of the rotating shaft 9 from an end of the second extension portion. Each of the heat dissipation units further includes heat dissipation fins 21 interposed in the third extension portion, and the heat dissipation fins 21 are provided on an inner side of the base plate 22 along the radial direction of the rotating shaft 9, to achieve effective heat dissipation in a limited space through a reasonable layout.

A cooling medium with a certain boiling point is within the heat pipe 20. Through the heat conduction of the base plate 22, the bottom of the heat pipe 20 (the portion closer to the rotating shaft 9 than the other portions of the heat pipe 20) absorbs heat, the cooling medium inside the heat pipe 20 evaporates into a gaseous cooling medium, the gaseous cooling medium starts to cool down under the heat dissipation of the heat dissipation fins 21, the gaseous cooling medium condenses into a liquid cooling medium, and the liquid cooling medium returns to the bottom of the heat pipe again by capillary action, thereby realizing a heat transfer cycle to cool the rotating shaft 9.

In addition, a situation that the heat pipe 20 includes multiple pipes arranged in parallel with each other is illustrated in FIG. 4, but the structure of the heat pipe 20 is not limited to this, and the heat pipe 20 may be embodied as a single pipe curved in a zigzag shape or multiple pipes curved in a zigzag shape.

By providing the annular heat dissipation assembly 15, the heat transferred to the rotating shaft 9 is sequentially transmitted to the base plates 22, the heat pipes 20, and the heat dissipation fins 21, and the cold air blown by the air blow boxes dissipates heat from the heat dissipation fins 21, to further reduce the temperature of the main bearing.

However, the structure of the annular heat dissipation assembly 15 according to the present application is not limited to this, and for example, the annular heat dissipation assembly 15 may only include the base plates 22 and the heat pipes 20 embedded in the base plates 22.

In addition, since the rotating shaft 9 is a large component, it is not allowed to punch the inner surface of the rotating shaft 9 to mount the base plates 22 in view of the performances such as strength and fatigue, so that an adhesive with high thermal conductivity and high bonding strength may be employed to fix the multiple base plates 22. However, the mounting manner of the base plates 22 is not limited to this, and an auxiliary mounting device may be employed as necessary.

A situation that a pressing strip 18 is used as an auxiliary mounting device for the annular heat dissipation assembly 15 is illustrated in an embodiment of the present application. The pressing strip 18 may be formed by splicing multiple arc segments together, and the outer surface of the pressing strip 18 has a size corresponding to the size of the inner surfaces of the multiple base plates 22 of the annular heat dissipation assembly 15, thus the annular heat dissipation assembly 15 can be fixedly mounted on the inner surface of the rotating shaft 9 by using the pressing strip 18 to support the inner surfaces of the multiple base plates 22. That is, the pressing strip with an entire circumference formed by splicing the multiple arc segments fixes the annular heat dissipation assembly 15 by generating a tension away from the center of the circle.

However, the manner of mounting the annular heat dissipation assembly 15 is not limited to the above manners, and any structure is feasible as long as it can fixedly mount the annular heat dissipation assembly 15 on the inner surface of the rotating shaft 9.

As shown in FIG. 3, the cold air supply unit according to the embodiment may include a condenser 12 and an air treatment tank 14. The condenser 12 may be mounted on a nacelle 4 of the wind turbine. The air treatment tank 14 includes an air inlet 14a for introducing external air, and an evaporator 23 provided in the air treatment tank 14. The evaporator 23 can form a circulation loop with the condenser 12 through a cooling medium pipe 13, to cool the introduced external air.

The condenser 12 is preferably mounted at the top of the nacelle 4, to discharge heat generated inside the wind turbine to the outside and to avoid additional temperature rise to the interior. A cooling medium is provided in the refrigeration system constituted by the condenser 12 and the evaporator 23. The cooling medium evaporates into a gaseous cooling medium in the evaporator 23, taking away heat of the air in the air treatment tank 14; the gaseous cooling medium flows to the condenser 12, and condensates into a liquid cooling medium in the condenser 12, releasing heat; and then the liquid cooling medium flows into the evaporator 23 again in the air treatment tank 14, and the above process is repeated. The air in the air treatment tank 14 is cooled by the phase transition of the cooling medium in the evaporator 23, and the cooled air can flow into the stationary-shaft air blow boxer 16 and the rotating-shaft air blow boxer 19 in the manner as described above.

In addition, the air treatment box 14 further includes a first air outlet and a second air outlet. The first air outlet can be in communication with the rotating-shaft air blow box 19 through the rotating-shaft air blow assembly 25, and the second air outlet can be in communication with the stationary-shaft air blow box 16 through the stationary-shaft air blow assembly 24. Fans may be respectively provided in the vicinity of the first air outlet and the vicinity of the second air outlet (for example, the rotating-shaft air blow assembly 25 and the stationary-shaft air blow assembly 24), so that the flow rate and flow amount of the blown cold air can be adjusted by adjusting the speed of the fans. In addition, a flow meter may be provided at a downstream side of the fans to detect the amount of blown cold air.

Further, temperature sensors may be respectively provided on the outer ring 11 and the inner ring 10, to sense the temperatures of the outer ring 11 and the inner ring 10, and the amount of air blown to the stationary-shaft air blow box 16 and the rotating-shaft air blow box 19 can be determined according to the sensed temperatures of the outer ring 11 and the inner ring 10. That is, more cold air is blown to a part having a higher temperature, and less cold air is blown to a part having a lower temperature, thereby specifically and effectively dissipating heat from the main bearing. The above solution will be described in detail below.

The cooling system according to the embodiment further includes an annular fixing bracket 17 for fixing the rotating-shaft air blow box 19 and the stationary-shaft air blow box 16. The annular fixing bracket 17 may be in the shape of a ladder wound into an annular shape and can be fixed to the inner surface of the stationary shaft 7 by its own tension force. The outer side surfaces of the stationary-shaft air blow box 16 and the rotating-shaft air blow box 19 may each have a shape corresponding to the shape of the annular fixing bracket 17, and can be mounted to the annular fixing bracket 17 through a fastening member (not shown).

The air treatment tank 14 can also be fixed to the stationary shaft 7 through the annular fixing bracket 17. The rotating-shaft air blow box 19, the stationary-shaft air blow box 16 and the air treatment box 14 can be fixed by a same annular fixing bracket 17 having a long length in the axial direction, or can be respectively fixed by their respective annular fixing brackets 17, which can be set according to the space in the stationary shaft 7 and the actual needs. By using the annular fixing bracket 17, the air treatment box 14 can be placed at a high position of the stationary shaft 7, so that the idle space of the shaft hole can be fully utilized without occupying a maintenance space of the shaft hole due to the additional equipment.

The cooling system according to the embodiment performs a forced convection heat transfer by means of power consumption, which will increase the electric power consumption of the wind turbine itself without doubt. Therefore, a control method of the cooling system is provided in the present application, to reduce energy consumption and increase energy utilization.

The wind turbine is in different external environments throughout the year, and only in summer the external environmental temperature is high and the temperature of air for dissipating heat from the main bearing is not required to be very low, therefore, the temperature of the main bearing can be controlled by combining the external natural wind and the cooling air generated by the cooling system. When the external environmental temperature T is lower than a first temperature threshold T1 (T<T1), the cooling system may not work, the cooling capacity is 0, and the external natural wind is introduced to directly cool the main bearing; when the external environmental temperature T is higher than a second temperature threshold T2 (T>T2), the cooling system is used to cool the air introduced into the air treatment tank 14, and at this time, the cooling capacity of the cooling system is M2; and when the external environmental temperature T is higher than or equal to the first temperature threshold T1 and lower than or equal to the second temperature threshold T2 (T1≤T≤T2), the cooling system is used to control a certain proportion of the cooling capacity and external natural wind is partially introduced, at this time, the cooling capacity of the cooling system is M1, where M1<M2. Additionally, the first temperature threshold may be 30° C. and the second temperature threshold may be 35° C.

The temperature of the main bearing is usually related to the external environmental temperature. Normally, the temperature of the main bearing is not lower than the external environmental temperature, so that the main bearing can be cooled by the cooling system only according to the temperature of the main bearing.

Specifically, whether the temperature of the main bearing is higher than a preset temperature threshold (the preset temperature threshold may be 35° C.) when the wind turbine is in operation can be determined by a temperature sensor provided on the main bearing. If a detected temperature is lower than the preset temperature threshold, the cooling system operates in a first operation mode; and if the detected temperature is higher than the preset temperature threshold, the cooling system operates in a second operation mode. In the first operation mode, the cold air supply unit only supplies natural wind, and in the second operation mode, the cold air supply unit only supplies cold air. In addition, a bearing clearance is critical to the operational reliability of the main bearing, and temperature is an important factor affecting the operation of the main bearing. Therefore, when cooling the main bearing, both the inner ring 10 and the outer ring 11 should be taken into consideration, to allow the inner ring 10 and the outer ring 11 to be cooled simultaneously, so that the temperature difference can be guaranteed to ensure the bearing clearance. For this reason, the air amounts blown to the stationary-shaft air blow box 16 and the rotating-shaft air blow box 19 should be controlled regardless of the first operation mode or the second operation mode. In an initial state, a first preset air amount may be supplied to the stationary-shaft air blow box 16 and a second preset air amount may be supplied to the rotating-shaft air blow box 19, and the second preset air amount supplied to the rotating-shaft air blow box 19 may be greater than the first preset air amount supplied to the stationary-shaft blow box 16.

Temperature sensors may be respectively arranged on the inner ring 10 and the outer ring 11 to sense the temperatures of the inner ring 10 and the outer ring 11.

Figure 6:
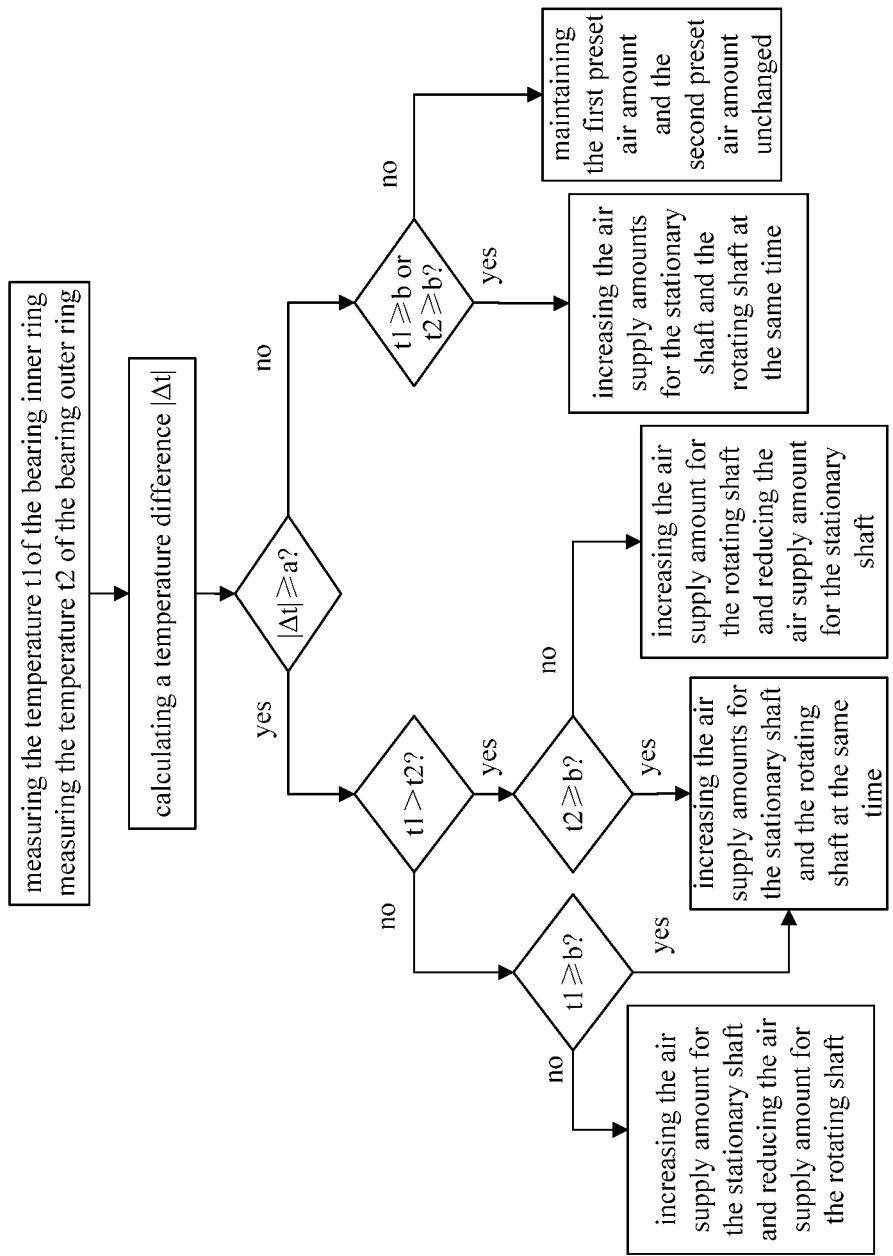
FIG. 6 is a flow chart showing processes of controlling air supply amounts of a stationary-shaft air blow box and a rotating-shaft air blow box according to an embodiment of the present application.

FIG. 6 is a flow chart showing processes of controlling air supply amounts of the stationary-shaft air blow box 16 and the rotating-shaft air blow box 19 according to an embodiment of the present application. The control method will be described in detail below with reference to FIG. 6.

It should be noted here that the control method of FIG. 6 is performed for the second operation mode, because in the first operation mode, the temperatures of the main bearing and the external environment are relatively low, thus it is only necessary to determine whether the temperature difference between the main bearing and the external environment is large. For example, it is determined whether the absolute value |Δt| of the temperature difference between the main bearing and the external environment is greater than the first preset temperature value, and if the absolute value |Δt| is greater than the first preset temperature value, it indicates that the temperature difference between the main bearing and the external environment is large, in this situation, since the main bearing and the external environment only have a large temperature difference, the temperatures of the main bearing and the external environment are both not high, so that it is only necessary to adjust the air supply amount of the cold air supply unit to increase the air amount supplied to the one having a higher temperature between the inner ring 10 and the outer ring 11 and reduce the air amount supplied to the other one; and if the absolute value |Δt| is not greater than the first preset temperature value, the first preset air amount and the second preset air amount supplied to the inner ring 10 and the outer ring 11 are maintained unchanged. Therefore, the second operation mode will be described below with reference to FIG. 6.

As described above, the temperature t1 of the inner ring 10 and the temperature t2 of the outer ring 11 can be respectively measured by temperature sensors.

Then, based on the temperatures sensed by the temperature sensors, the absolute value |Δt| of the temperature difference Δt between the inner ring 10 and the outer ring 11 is calculated.

Next, it is determined whether |Δt| is greater than or equal to the first preset temperature value a (for example, the first preset temperature value may be 5° C.).

In a case that the absolute value |Δt| is smaller than the first preset temperature value a, it is determined whether any one of the temperature t1 of the inner ring 10 and the temperature t2 of the outer ring 11 is higher than or equal to a second preset temperature value b (for example, the second preset temperature value b may be 60° C.). If any one of the temperature t1 of the inner ring 10 and the temperature t2 of the outer ring 11 is higher than or equal to the second preset temperature value (b), the air supply amounts for the stationary shaft and the rotating shaft are increased at the same time; if neither one of the temperature t1 of the inner ring 10 and the temperature t2 of the outer ring 11 is higher than or equal to the second preset temperature value (b), the first preset air amount and the second preset air amount may be maintained unchanged.

In a case that the absolute value |Δt| is greater than or equal to the first preset temperature value a, it is further determined whether the temperature t1 of the inner ring 10 is higher than the temperature t2 of the outer ring 11.

If the temperature t1 of the inner ring 10 is higher than the temperature t2 of the outer ring 11, it is determined whether the temperature t2 of the outer ring 11 having a lower temperature compared to the inner ring 10 is higher than or equal to the second preset temperature value b. If the temperature t2 is higher than or equal to the second preset temperature value b, it indicates that the temperature t1 of the inner ring 10 and the temperature t2 of the outer ring 11 both exceed the second preset temperature value b, so the air supply amounts for the stationary shaft and the rotating shaft are increased at the same time. If the temperature t2 of the outer ring 11 having the lower temperature is lower than the second preset temperature value b, in a situation that the temperature difference between the inner ring 10 and the outer ring 11 is large, the air supply amount for the inner ring 10 may be increased while the air supply amount for the outer ring 11 may be reduced (that is, the air supply amount for the rotating shaft is increased while the air supply amount for the stationary shaft is reduced).

If the temperature t1 of the inner ring 10 is not higher than the temperature t2 of the outer ring 11, it is determined whether the temperature t1 of the inner ring 10 having a lower temperature compared to the outer ring 11 is higher than or equal to the second preset temperature value b. Similar to the above process of determination, if the temperature t1 of the inner ring 10 is higher than or equal to the second preset temperature value b, the air supply amounts for the stationary shaft and the rotating shaft are increased at the same time; and if the temperature t1 of the inner ring 10 is lower than the second preset temperature value b, the air supply amount for the stationary shaft may be increased and the air supply amount for the rotating shaft may be reduced.

The cooling system according to the present application is added after the design of the wind turbine is completed according to the spatial layout of the wind turbine, which can achieve reliable installation and operation without affecting the operation of other components within the wind turbine.

The cooling system according to the present application can effectively and specifically dissipate heat from the main bearing through the combination of the cooling system and the annular heat dissipation assembly, so that the temperature the main bearing of the wind turbine is within a reasonable working range.

The cooling system according to the present application has air blow boxes respectively corresponding to the inner ring and the outer ring, so that the inner and outer rings can be synchronously cooled, thereby guaranteeing the temperature difference between the inner and outer rings and ensuring the working clearance of the bearing.

The air blow openings of the air blow box according to the present application can form a jet, thereby enhancing heat exchange to obtain a better cooling effect.

According to the control method of the cooling system in the present application, specific temperature difference control logic is proposed for heat generation inside the main bearing caused by different external environmental temperatures and the operation characteristics of the wind turbine itself, thereby guaranteeing the clearance of the main bearing and ensuring the operation safety.

Although the exemplary embodiments of the present application are described in detail above, it should be noted that, for the person skilled in the art, a few of modifications and variations may be made to the present application without departing from the principle and spirit of the present application. It should be understood that, for the person skilled in the art, these modifications and variations are also deemed to fall into the scope of the present application defined by the claims.

The invention claimed is:

1. A cooling system for a shafting of a wind turbine, the shafting comprising a stationary shaft, a rotating shaft, and a bearing provided between the stationary shaft and the rotating shaft, the bearing comprising an outer ring, rollers and an inner ring, the outer ring being connected to the stationary shaft, and the inner ring being connected to the rotating shaft, wherein the cooling system comprises:
   a cold air supply unit; and
   a rotating-shaft air blow box, wherein the rotating-shaft air blow box is mounted on an inner surface of the stationary shaft and is in a shape of a circular ring-shaped box, and the rotating-shaft air blow box axially faces the rotating shaft; a plurality of first air blow openings are uniformly distributed in a surface, axially facing the rotating shaft, of the rotating-shaft air blow box in a circumferential direction, to blow cold air from the cold air supply unit to the rotating shaft, and
   wherein each of the plurality of the first air blow openings is in a shape of a slit, to form a jet.

2. The cooling system according to claim 1, further comprising:
   a stationary-shaft air blow box, wherein the stationary-shaft air blow box is mounted on the inner surface of the stationary shaft and in a shape of a circular ring-shaped box, a plurality of second air blow openings are uniformly distributed in a surface, facing the shafting, of the stationary-shaft air blow box in a circumferential direction, to blow the cold air from the cold air supply unit to the outer ring, and wherein each of the plurality of the second air blow openings is in a shape of a slit, to form a jet.

3. The cooling system according to claim 2, wherein the cooling system further comprises an annular heat dissipation assembly fixedly mounted on an inner surface of the rotating shaft.

4. The cooling system according to claim 3, wherein the annular heat dissipation assembly comprises a plurality of heat dissipation units and each of the plurality of heat dissipation units comprises a base plate and a heat pipe embedded in the base plate.

5. The cooling system according to claim 4, wherein the heat pipe comprises a first extension portion extending inward along a radial direction of the rotating shaft from the base plate, a second extension portion extending along an axial direction of the rotating shaft from an end of the first extension portion, and a third extension portion extending inward along the radial direction of the rotating shaft from an end of the second extension portion, and each of the plurality of the heat dissipation units further comprises heat dissipation fins interposed in the third extension portion.

6. The cooling system according to claim 5, wherein the heat pipe comprises a single pipe formed by bending or a plurality of pipes arranged in parallel with each other.

7. The cooling system according to claim 4, wherein the annular heat dissipation assembly is mounted on the inner surface of the rotating shaft by a pressing strip, and wherein the pressing strip is formed by splicing a plurality of arc segments together, and is configured to support inner surfaces of the plurality of base plates to fixedly mount the annular heat dissipation assembly on the inner surface of the rotating shaft.

8. The cooling system according to claim 2, wherein the cold air supply unit comprises:

a condenser being mounted on a nacelle of the wind turbine; and an air treatment tank, wherein the air treatment tank comprises: an evaporator forming a circulation loop with the condenser through a cooling medium pipe; and an air inlet for introducing external air.

9. The cooling system according to claim 8, wherein the air treatment tank further comprises: a first air blow opening in communication with the rotating-shaft air blow box, and a second air blow opening in communication with the stationary-shaft air blow box; and fans are respectively provided in the vicinity of the first air blow opening and the second air blow opening.

10. The cooling system according to claim 8, wherein the cooling system further comprises an annular fixing bracket for fixing the rotating-shaft air blow box, the stationary-shaft air blow box and the air treatment tank.

11. The cooling system according to claim 5, wherein the annular heat dissipation assembly is mounted on the inner surface of the rotating shaft by a pressing strip, and wherein the pressing strip is formed by splicing a plurality of arc segments together, and is configured to support inner surfaces of the plurality of base plates to fixedly mount the annular heat dissipation assembly on the inner surface of the rotating shaft.

12. The cooling system according to claim 6, wherein the annular heat dissipation assembly is mounted on the inner surface of the rotating shaft by a pressing strip, and wherein the pressing strip is formed by splicing a plurality of arc segments together, and is configured to support inner surfaces of the plurality of base plates to fixedly mount the annular heat dissipation assembly on the inner surface of the rotating shaft.

13. The cooling system according to claim 3, wherein the cold air supply unit comprises:

a condenser being mounted on a nacelle of the wind turbine; and an air treatment tank, wherein the air treatment tank comprises: an evaporator forming a circulation loop with the condenser through a cooling medium pipe; and an air inlet for introducing external air.

14. The cooling system according to claim 4, wherein the cold air supply unit comprises:

a condenser being mounted on a nacelle of the wind turbine; and an air treatment tank, wherein the air treatment tank comprises: an evaporator forming a circulation loop with the condenser through a cooling medium pipe; and an air inlet for introducing external air.

15. The cooling system according to claim 5, wherein the cold air supply unit comprises:

a condenser being mounted on a nacelle of the wind turbine; and an air treatment tank, wherein the air treatment tank comprises: an evaporator forming a circulation loop with the condenser through a cooling medium pipe; and an air inlet for introducing external air.

16. A wind turbine, wherein the wind turbine comprises the cooling system according to claim 1.

17. A control method for the cooling system according to claim 1, comprising:

determining whether a temperature of the shafting is higher than a preset temperature threshold when the wind turbine is in operation;

operating the cooling system in a first operation mode if the temperature of the shafting is lower than the preset temperature threshold; and operating the cooling system in a second operation mode if the temperature of the shafting is higher than the preset temperature threshold; and wherein the cold air supply unit supplies natural wind in the first operation mode and supplies cold air in the second operation mode, and the natural wind or the cold air is blown to the rotating shaft via the plurality of first air blow openings of the rotating-shaft air blow box.

18. The control method according to claim 17, wherein the cooling system further comprises a stationary-shaft air blow box, the stationary-shaft air blow box is mounted on the inner surface of the stationary shaft and in a shape of a circular ring-shaped box, a plurality of second air blow openings are uniformly distributed in a surface, facing the shafting, of the stationary-shaft air blow box in a circumferential direction, to blow the cold air from the cold air supply unit to the outer ring, and each of the plurality of the second air blow openings is in a shape of a slit, to form a jet; and wherein, the control method comprises;

calculating a temperature difference between the inner ring and the outer ring in the first operation mode;

supplying a first preset air amount to the outer ring and a second preset air amount to the rotating shaft in a case that an absolute value of the temperature difference is smaller than a first preset temperature value; and adjusting an air supply amount of the cold air supply unit in a case that the absolute value of the temperature difference is greater than or equal to the first preset temperature value, to increase an air amount supplied to one having a higher temperature between the inner ring and the outer ring and reduce an air amount supplied to the other one having a lower temperature between the inner ring and the outer ring.

19. The control method according to claim 18, comprising:

calculating the absolute value of the temperature difference between the inner ring and the outer ring in the second operation mode;

determining whether at least one of the inner ring and the outer ring has a temperature higher than or equal to a second preset temperature value in a case that the absolute value is smaller than the first preset temperature value; increasing air supply amounts for the stationary shaft and the rotating shaft at the same time if at least one of the inner ring and the outer ring has a temperature higher than or equal to the second preset temperature value; and maintaining the first preset air amount and the second preset air amount unchanged if neither one of the inner ring and the outer ring has a temperature higher than or equal to the second preset temperature value;

determining whether a temperature of the inner ring is higher than a temperature of the outer ring in a case that the absolute value is greater than or equal to the first preset temperature value, determining whether the temperature of the outer ring is higher than or equal to the second preset temperature value if the temperature of the inner ring is higher than the temperature of the outer ring; increasing the air supply amounts for the stationary shaft and the rotating shaft at the same time if the temperature of the outer ring is higher than or equal to the second preset temperature value; and increasing the air supply amount for the rotating shaft and reducing the air supply amount for the stationary shaft if the temperature of the outer ring is lower than the second preset temperature value; and determining whether the temperature of the inner ring is higher than or equal to the second preset temperature value if the temperature of the inner ring is lower than or equal to the temperature of the outer ring; increasing the air supply amounts for the stationary shaft and the rotating shaft at the same time if the temperature of the inner ring is higher than or equal to the second preset temperature value; and increasing the air supply amount for the stationary shaft and reducing the air supply amount for the rotating shaft if the temperature of the inner ring is lower than the second preset temperature value.

20. The control method according to claim 19, wherein the preset temperature threshold is 35° C., the first preset temperature value is 5° C., and the second preset temperature value is 60° C.

* * * * *